United States Patent [19]
Upadhye et al.

[11] Patent Number: 5,545,800
[45] Date of Patent: Aug. 13, 1996

[54] CLEAN PROCESS TO DESTROY ARSENIC-CONTAINING ORGANIC COMPOUNDS WITH RECOVERY OF ARSENIC

[75] Inventors: Ravindra S. Upadhye, Pleasanton; Francis T. Wang, Danville, both of Calif.

[73] Assignee: Regents of the University of California, Oakland, Calif.

[21] Appl. No.: 278,207

[22] Filed: Jul. 21, 1994

[51] Int. Cl.$^6$ .................................................. C22B 30/04
[52] U.S. Cl. .............................. 588/231; 75/706; 423/87; 423/645; 588/200; 588/236
[58] Field of Search .................................. 588/200, 231, 588/236; 423/87, 645; 75/706

[56] References Cited

U.S. PATENT DOCUMENTS

| | | | |
|---|---|---|---|
| 3,428,428 | 2/1969 | Miederer et al. | 423/645 |
| 3,966,412 | 6/1976 | Stroterhoff et al. | 436/422 |
| 4,631,183 | 12/1986 | Lalancette et al. | 423/210 |
| 4,744,917 | 5/1988 | Scardera et al. | 252/134 |
| 4,784,699 | 11/1988 | Cowsar et al. | |
| 4,842,746 | 6/1989 | Fowler et al. | 210/570 |
| 5,156,827 | 10/1992 | Tom et al. | 423/645 |

FOREIGN PATENT DOCUMENTS

| | | | |
|---|---|---|---|
| 1082849 | 3/1984 | U.S.S.R. | 75/706 |

OTHER PUBLICATIONS

Kirk–Othmer, Encyclopedia of Chemical Technology, Third Edition, vol. 3 (1978), John Wiley & Sons, pp. 243, 244, 251–253.
Chemical Abstracts 105:182978 (1986).

*Primary Examiner*—Wayne Langel
*Attorney, Agent, or Firm*—Henry P. Sartorio; Daryl S. Grzybicki

[57] ABSTRACT

A reduction method is provided for the treatment of arsenic-containing organic compounds with simultaneous recovery of pure arsenic. Arsenic-containing organic compounds include pesticides, herbicides, and chemical warfare agents such as Lewisite. The arsenic-containing compound is decomposed using a reducing agent. Arsine gas may be formed directly by using a hydrogen-rich reducing agent, or a metal arsenide may be formed using a pure metal reducing agent. In the latter case, the arsenide is reacted with an acid to form arsine gas. In either case, the arsine gas is then reduced to elemental arsenic.

7 Claims, 1 Drawing Sheet

CLEAN PROCESS TO DESTROY ARSENIC-CONTAINING ORGANIC COMPOUNDS WITH RECOVERY OF ARSENIC

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to the chemical destruction of arsenic-containing organic waste or chemical agents, such as Lewisite, with simultaneous recovery of pure arsenic.

2. Description of Related Art

The destruction or neutralization of organic compounds containing arsenic presents a challenge due to the high toxicity and volatility of arsenic and its compounds. Arsenic-containing organic compounds are used as pesticides, herbicides, and less conventionally as chemical warfare agents. The destruction of these compounds is desirable to reduce storage of hazardous waste and to demilitarize stockpiles of chemical warfare agents.

Methods for detecting the presence of toxic chemical agents and decontaminating articles in contact with these agents have valuable industrial and military applications. Various methods have been devised to deactivate or decontaminate dangerous nerve and blister agents, including those containing arsenic. For example, U.S. Pat. No. 4,842,746 discloses a method for removing chemical nerve and blister agents from a cleaning solvent by preferential adsorption. U.S. Pat. No. 4,744,917 discloses the preparation and application of toxic chemical agent decontamination emulsions. U.S. Pat. No. 4,784,699 discloses a process for decontaminating military nerve and blister agents by contacting with gaseous ozone or chlorine dioxide to oxidize the agents to non-toxic products. These methods, however, do not destroy the offending compound.

U.S. Pat. No. 4,631,183 does disclose a two-step process for the destruction of toxic organic halogenated substances, including arsenic compounds. The first step is performed in a reaction chamber under a reductive atmosphere and at high temperatures (1000° C.–1600° C.) in the presence of an alkali or alkaline earth metal generated in situ. The second step is the oxidation of the resulting products, such as carbon monoxide.

The latter method and other standard hazardous waste destruction methods, such as incineration or molten salt destruction, are based on oxidation of the waste and can be very efficient, easy to implement, and economical. Applying these methods to the destruction of arsenic-containing organic compounds, however, is environmentally unacceptable. Typical oxidative processes operating at high temperatures tend to disperse the toxicity. Incineration, in particular, releases hazardous substances containing arsenic and also fails to recover the pure form, which is a valuable product.

The use of any oxidative destruction process, such as incineration, with arsenic-containing compounds will produce arsenic oxide in the final waste. Arsenic oxide is difficult to dispose of in large quantities, even assuming it can be trapped. To convert the oxide to a useful chemical, the arsenic must be separated from other components of the waste and then reduced to its pure form. This purification process is costly.

A more efficient process for destroying these compounds is needed. An ideal treatment of arsenic-containing organic compounds would not only destroy the compound, but also separate arsenic from the final waste in a pure form. Pure arsenic can be used as raw material for the manufacture of gallium arsenide, which is used to make semiconductor devices.

SUMMARY OF THE INVENTION

The invention is a process for destroying arsenic-containing organic compounds with simultaneous recovery of pure arsenic. The invention uses a reducing agent to decompose the compound. The reducing agents may include alkali metals, alkaline earth metals, hydrides, and hydrogen gas. In the case of a pure metal reducing agent, an intermediate metal arsenide is formed that may be acidified to form an arsenic-containing gas, such as arsine ($AsH_3$). If a hydride or hydrogen gas is used as the reducing agent, then arsine gas is formed directly in a one-step process. In either case, the arsine gas is then reduced to pure arsenic by a thermal or chemical process. The present method is a reduction process that does not involve the oxidation of arsenic to arsenic oxide, thereby avoiding the costly separation or disposal of this oxide.

An arsenic-containing organic compound of particular interest is Lewisite (chlorovinyldichloroarsine), a blister agent that is a major chemical warfare agent stockpiled in the former Soviet Union. An environmentally sound method is needed to destroy or demilitarize these supplies. The present invention permits the destruction of these supplies and simultaneously addresses the destruction or demilitarization of arsenic-containing organic compounds and the recovery of arsenic in pure form. The recovery of pure arsenic as a by-product is a highly advantageous feature of the present method, since arsenic is used in the production of gallium arsenide, a semiconductor material. In addition, the direct formation of arsine gas from a chemical agent such as Lewisite greatly simplifies and improves the process of demilitarizing these compounds.

DETAILED DESCRIPTION OF THE INVENTION

Figure 1:
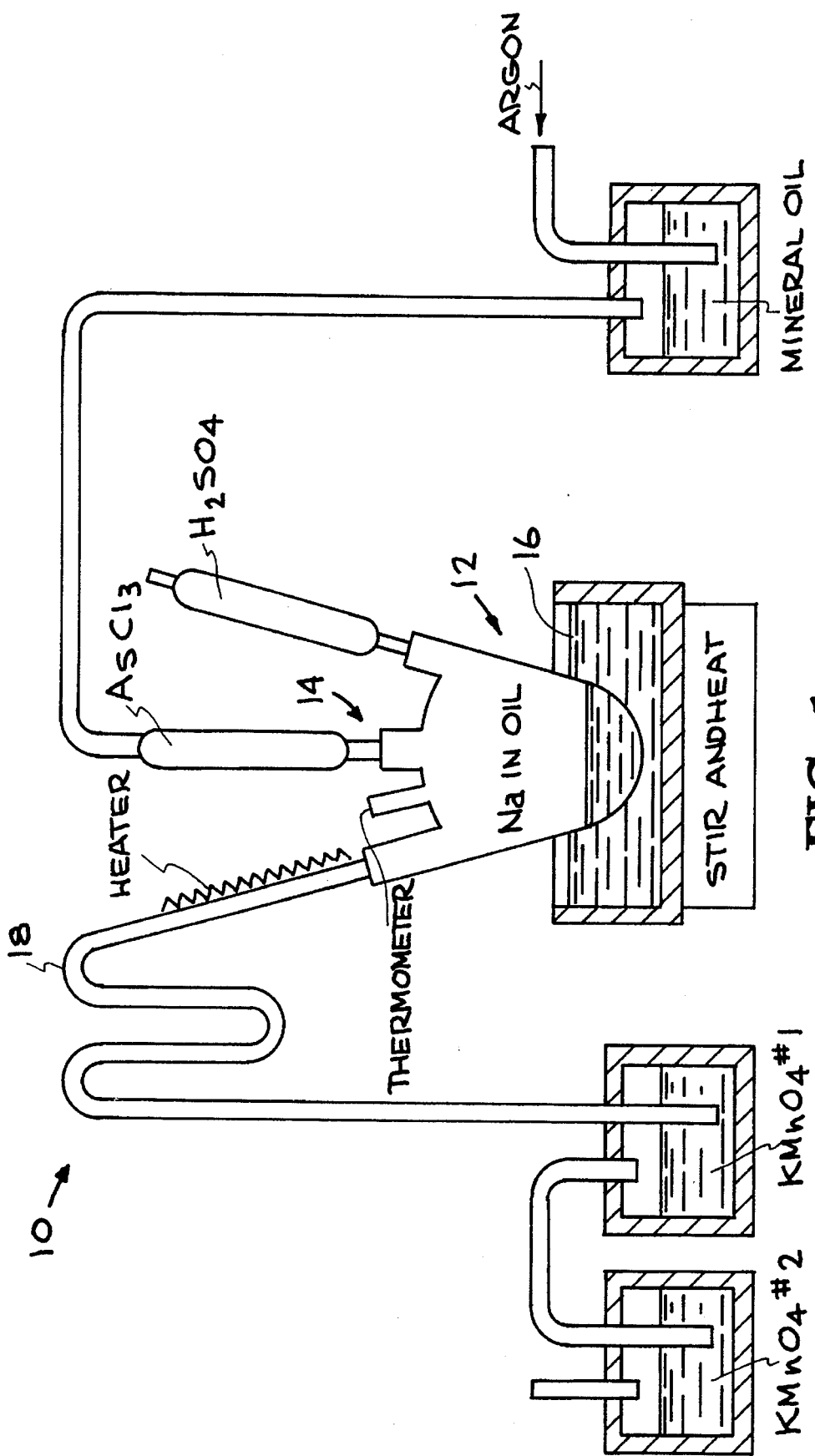
FIG. 1 shows an apparatus for destroying $AsCl_3$, a surrogate for Lewisite.

The present invention is a process for destroying arsenic-containing organic compounds and simultaneously recovering pure arsenic. Suitable arsenic-containing compounds for use in this process include pesticides, herbicides, and chemical warfare agents, such as Lewisite. Arsenic-based pesticides may include arsenic acid, arsenic pentoxide, cacodylic acid, disodium methanearsenate (DSMA), monosodium methanearsenate (MSMA), arsenic trioxide, calcium arsenate, and sodium arsenite.

In the present invention, an arsenic-containing compound, such as Lewisite, is mixed with or dissolved in an organic solvent. Dissolution of the compound is not necessary for successful completion of the process. The organic solvent should be nonaqueous and not react with the arsenic compound or the reducing agent (described below). Examples of suitable organic solvents include ether and paraffin oils, such as mineral oil. Mixtures of different solvents, such as ether and mineral oil, may be used.

The mixture of the arsenic compound and organic solvent is brought in contact with a reducing agent. An excess amount of the agent is typically used. The reducing agent may be any element having reducing properties. Reducing agents may include, but are not limited to, alkali metals (Group I), alkaline earth metals (Group II), aluminum, iron, graphite, hydrides, and hydrogen gas. Sodium, calcium, and aluminum are commonly used due to their availability, low cost, and relative non-toxicity. The reducing agent may be in solid or liquid (molten) form and may be pre-mixed in the organic solvent. The temperature for the reaction depends on the reducing agent chosen; sodium, for example, can be used at low (room) temperatures, while graphite would require much higher temperatures. Hydrogen gas may also require high temperatures and a catalyst.

In the case of a pure metal reducing agent, the arsenic compound typically reacts with the agent to form three products: a solid metal arsenide, a salt, and an organic gas or liquid (depending on the starting compound). The possible reactions may be represented by the following:

$$RAsX+M \Rightarrow MAs+MX+R.$$

R represents an organic group, X is an optional inorganic group (e.g., a halogen, oxygen), and M is the reducing agent, such as sodium. If the arsenic compound is halogenated, then the halogen may react with the reducing agent to form a metal halide (MX), which immobilizes the halogen. Any gas (R) produced by the reaction may be scrubbed and flared.

Using Lewisite ($Cl_2AsCHCHCl$) as an example of the starting compound, the Lewisite may be mixed with mineral oil and reacted with sodium metal. Sodium arsenide, sodium chloride, and acetylene gas are formed according to the following reaction:

$$Cl_2AsCHCHCl+6Na \Rightarrow Na_3As(s)+3NaCl\ (s)+C_2H_2(g).$$

The resultant slurry of organic solvent and the solids may be separated. In the Lewisite example, the mixture of oil, sodium chloride, and sodium arsenide may be passed through a filter to separate the insoluble sodium compounds from the oil, which may be recycled back to mix with more of the starting compound. The acetylene gas may be collected as a useful by-product.

When the reducing agent is a pure metal, a second reaction is required to convert the arsenide to an arsenic-containing gas. The arsenide from the first reaction is typically separated out and reacted with an acid, and the acidification forms an arsenic-containing gas, such as arsine ($ASH_3$). The acid is typically a strong mineral acid, such as sulfuric acid. The reaction of an alkali metal arsenide with hydrogen ions may be represented as follows:

$$M_3As+3H+ \Rightarrow AsH_3\ (g)+3M+.$$

In the Lewisite example, the solid sodium chloride and sodium arsenide mixture can be separated out and contacted with an acid, which decomposes the sodium arsenide into sodium ions and arsine gas.

$$Na_3As(s)+3H+ \Rightarrow AsH_3\ (g)+3Na+$$

When a hydride or hydrogen gas is used as the reducing agent, the destruction process may be simplified since arsine gas can be formed in the first step, making the acidification step unnecessary. The arsenic compound reacts with the hydride or hydrogen gas to form arsine gas ($ASH_3$), a salt, and an organic gas or liquid (depending on the starting compound). The hydride is typically a hydride of an alkali metal or alkaline earth metal. The possible reactions using a hydride may be represented by the following:

$$RAsX+MH\ (excess) \Rightarrow AsH_3+MX+RH.$$

In the reaction of Lewisite and sodium hydride, the products of arsine gas, sodium chloride, and acetylene gas are formed according to the following reaction:

$$Cl_2AsCHCHCl+3NaH=AsH_3\ (g)+3NaCl\ (s)+HCCH(g).$$

After the arsine gas is produced, either directly using a hydrogen-rich reducing agent or by the two-step process, the gas is removed and reduced or converted to pure arsenic. This conversion may be a thermal or chemical process, but typically is accomplished by heating the arsine gas to a temperature greater than about 300° C. Hydrogen gas evolved from the reaction may be removed for further use or scrubbed and flared.

$$2AsH_3\ (>300°\ C.) \Rightarrow 2As+3H_2$$

The arsine gas may be reduced through contact with hot surfaces, which decompose the gas. Pure arsenic may then be deposited (condensed) and collected on cooler (<300° C.) surfaces. The collecting surfaces may be in the form of plates or beads and made from a substrate such as arsenic, quartz, or glass.

The arsenic is not oxidized in the method of the present invention, but undergoes a reductive process. As shown by the foregoing reactions, the arsenic-containing compound is reduced to valuable pure arsenic in the process of destroying or demilitarizing the starting compound.

EXAMPLE—$AsCl_3$

Since arsenic-containing organic compounds, particularly Lewisite, are highly toxic and can be difficult (or illegal) to obtain, a surrogate arsenic compound has been tested, specifically arsenic chloride ($AsCl_3$). The apparatus for destroying $AsCl_3$ is shown in FIG. 1.

The system 10 is first flushed with argon gas. During the entire process, argon is flowing through the system 10 at a rate of about 15 mL/min. Approximately 30 mL of mineral oil is poured into the reactor 12. A mixture of 1.6 g of 40% dispersed sodium (~30 mmoles) in mineral oil and 10 mL of ether is also added to the reactor 12. A solution of 0.21 mL (2.5 mmoles) of $AsCl_3$ in 8 mL of ether is poured into a dropping funnel 14 and added dropwise into the reactor 12 while the mineral oil is vigorously stirred. After the completion of $AsCl_3$ addition, the mixture is heated to 90° C. for 10 hours.

The mixture is then cooled to room temperature, and then ice is added to a water bath 16. Quartz tubing 18 is heated to about 400° C., and 30 mL of 1M $H_2SO_4$ is added dropwise into the reactor 12. The heated quartz tubing 18 is used for the thermal decomposition of $ASH_3$. The ice bath 16 is removed and the mixture is stirred overnight. In this demonstration, the evolved arsine gas was oxidized to water-soluble arsenic oxide by a KMnO$_4$ solution. To obtain pure arsenic according to the present invention, however, the arsine gas is captured and reduced, typically by heating (~300°–400° C.).

The foregoing description of preferred embodiments of the invention is presented for purposes of illustration and description and is not intended to be exhaustive or to limit the invention to the precise form disclosed. Many modifications and variations are possible in light of the above teaching.

We claim:

1. A non-hazardous waste treatment process for recovering pure arsenic from arsenic-containing organic waste, comprising:

reducing arsenic-containing organic waste compounds to a solid metal arsenide in a nonaqueous organic solvent using excess amounts of a pure metal reducing agent selected from the group consisting of alkali metals, alkaline earth metals, aluminum, and iron, wherein the temperature for the reaction is limited by the boiling point of the solvent;

separating the arsenide from the solvent; reacting the arsenide with a strong acid to form arsine gas; and recovering pure arsenic product from the arsine gas.

2. A process as recited in claim 1, wherein the temperature for the reaction is room temperature.

3. A process as recited in claim 1, wherein the reducing agent is sodium metal.

4. A process as recited in claim 1, wherein the reducing agent is iron powder.

5. A process as recited in claim 1, wherein the arsenic-containing waste comprises compounds selected from the group consisting of Lewisite (chlorovinyldichloroarsine), arsenic acid, arsenic pentoxide, cacodylic acid, disodium methanearsenate (DSMA), monosodium methanearsenate (MSMA), arsenic trioxide, calcium arsenate, and sodium arsenite.

6. A process as recited in claim 1, wherein the arsenic-containing waste includes a halogen.

7. A process as recited in claim 1, wherein the recovery of pure arsenic is carried out by depositing arsenic on a substrate having a temperature less than about 300° C.

* * * * *